United States Patent
Schlesinger et al.

(10) Patent No.: US 10,467,624 B2
(45) Date of Patent: Nov. 5, 2019

(54) MOBILE DEVICES ENABLING CUSTOMER IDENTITY VALIDATION VIA CENTRAL DEPOSITORY

(71) Applicant: PAYPAL, INC., San Jose, CA (US)

(72) Inventors: Lisa Rene Schlesinger, San Jose, CA (US); Max Edward Metral, Brookline, MA (US); Sandy Lynn Godsey, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 695 days.

(21) Appl. No.: 15/197,234

(22) Filed: Jun. 29, 2016

(65) Prior Publication Data
US 2018/0005239 A1    Jan. 4, 2018

(51) Int. Cl.
*G06Q 20/40* (2012.01)
*G06K 19/06* (2006.01)
*G06K 7/14* (2006.01)
*G06Q 20/32* (2012.01)
*G09C 5/00* (2006.01)
*H04L 9/08* (2006.01)
*H04L 9/32* (2006.01)

(52) U.S. Cl.
CPC ....... *G06Q 20/4014* (2013.01); *G06K 7/1413* (2013.01); *G06K 7/1417* (2013.01); *G06K 19/06028* (2013.01); *G06K 19/06037* (2013.01); *G06Q 20/3274* (2013.01); *G09C 5/00* (2013.01); *H04L 9/0825* (2013.01); *H04L 9/3226* (2013.01)

(58) Field of Classification Search
None
See application file for complete search history.

(56) References Cited

U.S. PATENT DOCUMENTS

2013/0219479 A1\* 8/2013 DeSoto ................ H04W 12/06
                                                            726/6
2018/0114207 A1\* 4/2018 Budde ................ G06Q 20/4014

\* cited by examiner

*Primary Examiner* — Kristy A Haupt
(74) *Attorney, Agent, or Firm* — Haynes and Boone, LLP

(57) ABSTRACT

A mobile device is provided that allows a user to generate and present a unique code/token to a service provider for customer identity validation. The service provider may use the unique code/token to retrieve or verify identity information/documents from a central depository to validate the identity of the customer to meet a Know-Your-Customer (KYC), or other identification requirements. The central depository or a central database may facilitate customer identity validation from multiple participants. Information related to proofs of customer identity may be collected and aggregated from multiple verification points and may be used to provide customer identity validation. As such, customers do not have to provide the same proofs of identity again when registering with a new service provider.

20 Claims, 6 Drawing Sheets

MOBILE DEVICES ENABLING CUSTOMER IDENTITY VALIDATION VIA CENTRAL DEPOSITORY

BACKGROUND

Field of the Invention

The present invention generally relates to electronic security and authentication and more particularly to electronic transactions including web-based, mobile, and other devices, systems, and methods for facilitating customer identity validation via a central depository.

Related Art

Many laws and regulations set forth various Know Your Customer (KYC) requirements. As such, service providers, such as banks, credit card companies, money service businesses, and the like, may be required to verify the identities of their customers based on KYC regulations. It may become costly for service providers to meet various KYC requirements. Further, it may be inconvenient and cumbersome for customers having to provide various proofs of identification each time the customers register with a new service provider. Therefore, there is a need for an improved system or method that facilitates customer identity validation process to meet the various KYC regulations/requirements.

Figure 1:
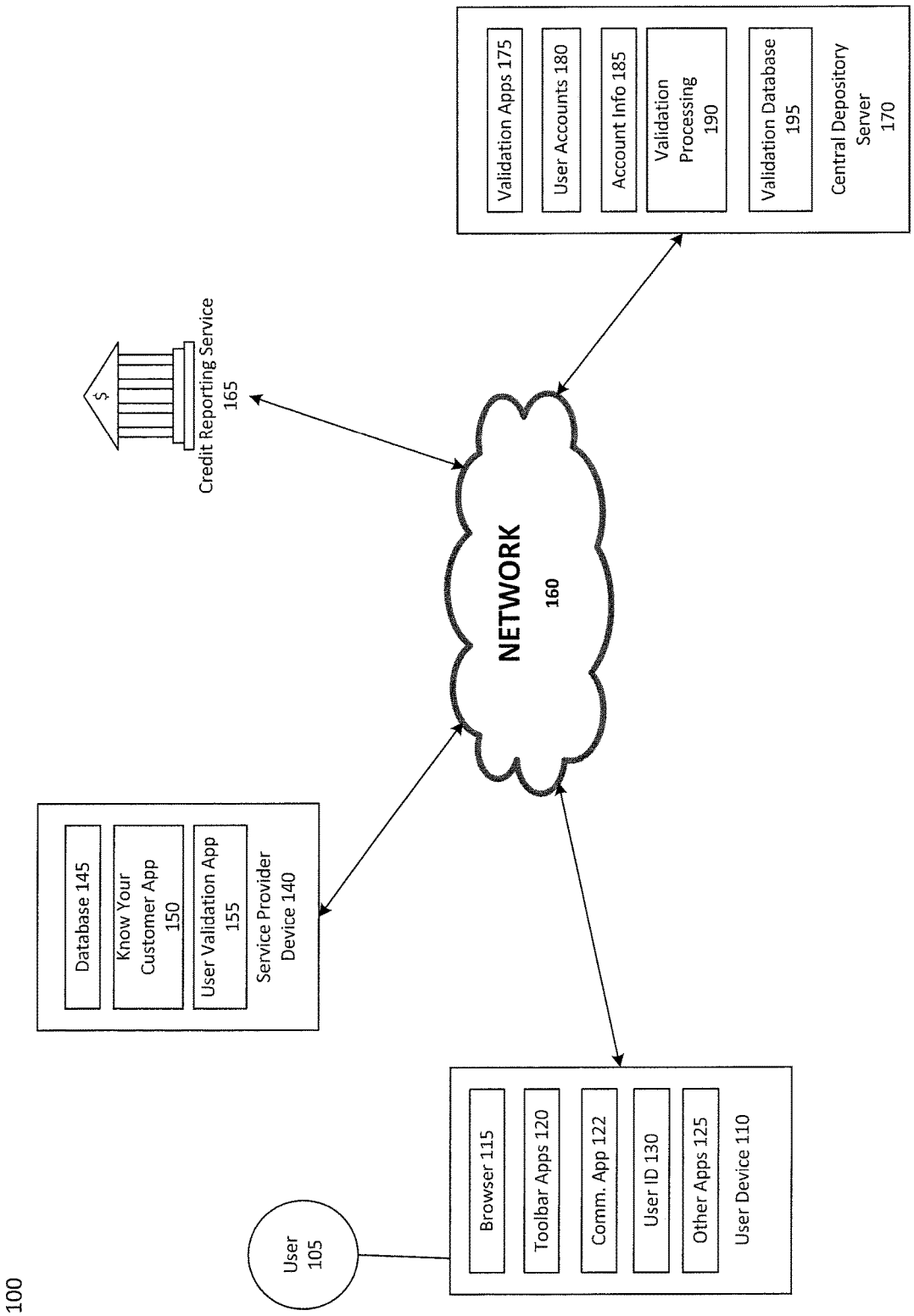
FIG. 1 is a block diagram of a networked system suitable for facilitating customer identity validation credit/risk background checks according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a central depository or a central database may be provided to facilitate customer identity validation from multiple participants. Information related to evidence and proofs of customer identity may be collected and aggregated from multiple verification points and may be used to provide customer identity validation. For example, a central depository or a central database may collect/aggregate different proofs of identity from different service providers and may provide the aggregated identity information to a new service provider to validate a customer's identity. As such, the customers do not have to provide the same proofs of identity again when registering with a new service provider.

In an embodiment, the central depository may create a unique identity validation profile for each customer/person. The central depository may aggregate, analyze, and organize identity information received from various sources, such as from different service providers or from customers themselves, including from various electronic sites obtained from scraping such sites. The central depository may analyze and rate different types of identity information based on type of source, degree of authenticity, issuing authority, and the like. The central depository also may store and organize information based on different KYC regulations/rules/requirement from various jurisdictions for different types of services or different levels of identity verification.

In an embodiment, a mobile app may be provided on a customer's mobile device. The customer may use the mobile app to request for identity validation. For example, when a new service provider requests proof of identity from the customer, the customer may use the mobile app to generate and present a unique code to the new service provider. The unique code may be associated with the customer's identity validation information at a central depository. The new service provider may use the unique code to obtain proofs of identity for the customer from the central depository.

In an embodiment, the service provider may request the required identity information from the central depository. In some embodiments, the customer may provide the required identity information to the central depository and the central depository may confirm the identity information received from the customer. In some embodiments, the customer may consent to allow the central depository to provide identity information to the service provider and also allow the central depository to receive and manage identity information of the customer received from other entities. In some embodiments, the customer may consent to allow the central depository to provide confirmation or denial of the customer's identity. For example, the central depository may respond with a "yes" or a "no" based on matching the received identity information with those stored at the central depository, without providing specific information to the service provider. The central depository also may provide a score to the service provider indicating a percentage of certainty that the customer is who she/he says she/he is.

In an embodiment, the central depository may automatically determine and select KYC regulations/requirements that apply to a requesting service provider. The KYC regulations/requirements may be selected based on the type of service provider, the geographic location/jurisdiction where the requesting service provider is located, the type of account/customer to be validated, and the like. The central depository may determine relevant identity validation information based on KYC the regulation or requirement for the requesting service provider. For example, the central depository may determine whether the central depository holds sufficient information to meet the KYC regulation/requirement. The central depository may notify the requesting service provider or customer any missing information that is still required to satisfy a particular KYC regulation/requirement.

In some embodiments, service providers may coordinate to share customer information without a central depository. For example, when registering for a new account at a service provider, the customer may provide multiple identity points, such as other service providers where the customer already has been validated. The requesting service may reach out to these other service providers to obtain customer's information for validation. The central depository also may keep a log or history of requests for identity validation from various service providers.

By implementing a central depository server for customer identity validation, service providers and customers may share identity information/document with each other electronically. For example, customers no longer have to physically carry and show identity documents to be validated. Customers may use a mobile app to generate and present a unique code which may be used by a service provider to electronically retrieve customers' identity information/documents from the central depository server. Service providers and/or customers also may share and be notified when any of the customer's identity information/document is compromised.

FIG. 1 is a block diagram of a networked system 100 suitable for implementing a process for facilitating customer identity validation according to an embodiment. Networked system 100 may comprise or implement a plurality of servers and/or software components that operate to perform various payment transactions or processes. Servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a credit reporting service 165, a service provider device 140, and a central depository server 170 in communication over a network 160. A public entity, such as a government or a non-profit organization, or a private entity, such as an identity validation service provider, may maintain the central depository server 170. The central depository server 170 may include a network of servers configured to collect identity information from customers, credit reporting services 165, and/or service providers. The central depository server 170 may receive requests for identity validation from customers, credit reporting services, or service providers. The central depository server 170 may respond with appropriate identity information based on a requester's subscription, KYC regulation/requirement, and/or available identity information.

A user 105, such as a service customer, or a service provider with the consent of the user 105 may request identity validation from central depository server 170. For example, when a service provider requests identity validation from user 105, user 105 may utilize user device 110 to generate and display a unique code/token to the service provider. The service provider may use the unique code/token to request identity validation information of the user 105 from central depository server 170. In another example, the service provider may have a subscription with the central depository and may have access privilege at the central depository server 170 to obtain identity validation information of the user 105 directly from the central depository server 170.

User device 110, service provider device 140, and central depository server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, user device 110 may be implemented as a personal computer (PC), a smart phone, wearable computing device, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications. In another example, a mobile identity validation app from the central depository may be installed at the user device 110. The mobile identity validation app may allow the user 105 to generate and display a unique code/token. The unique code/token may be presented or provided to service providers who request the user 105's identity validation.

Applications 125 may also include email, texting, voice and IM applications that allow user 105 to send and receive emails, calls, and texts through network 160, as well as applications that enable the user to communicate, transfer information, conduct electronic transactions, and the like. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by the central depository to associate user 105 with a particular identity validation profile maintained by the central depository. A communications application 122, with associated interfaces, enables user device 110 to communicate within system 100.

Credit reporting service 165 may be operated by one or more credit reporting service providers, such as Equifax, Experian, TransUnion, or FICO. The credit reporting service 165 may monitor and keep track of consumers' credit histories, transaction histories and various credit or financial risk related information of consumers. Credit reporting service 165 may provide central depository and other service providers with reports of credit history or background checks.

Service provider device 140 may be maintained, for example, by a bank, a credit union, a merchant or entities that offer various products and/or services. The service provider may have a physical point-of-sale (POS) storefront. The service provider may be a participating service provider who has a subscription account with the central depository. For example, a service provider may pay the central depository to receive customer identity validation service from the central depository. Different levels of subscription may be available at the central depository corresponding to different levels of customer identity validation service. Merchant device 140 may be used for POS or online purchases and transactions.

Service provider device 140 may include a database 145 identifying available products (including digital goods) and/or services. The database 145 also may store various KYC requirements/regulations associated different services/products/jurisdictions. The service provider device 140 also may include a Know Your Customer app 150 which allows the service provider to request and receive customer identity validation information from central depository server 170.

Service provider device 140 also may include a user validation app 155 which may be configured to facilitate customer identity validation with a customer's user device 110 online or at a physical POS or store front. The user validation app 155 may be configured to accept a unique code/token from a customer, e.g., via a scanner, wireless interface, or various user input interface. For example, the user validation app 155 may receive and process the unique code/token from user device 110 and may communicate the unique code/token to the central depository server 170 to request identity validation information of the user 105.

The service provider device 140 may be an electronic device including, but not limited to a mobile device or a POS device including an input device configured to receive the unique code/token of a customer for identity validation. For example, the input device may be a scanner configured to scan a bar code or QR code associated with or corresponding to the unique code/token. In another example, the input device may be a keypad or a touch screen from which a customer/user may input the unique code/token for identity validation. The service provider device 110 may communicate the unique code/token and a request for customer identity validation to the central depository to obtain identity validation information of the user/customer.

Central depository server 170 may manage and facilitate customer identity validation between service providers and customers. In this regard, central depository server 170 may include one or more validation applications 175 which may be configured to interact with user device 110 and/or service provider device 140 over network 160 to facilitate customer identity validation and communicate/display information.

Central depository server 170 also maintains a plurality of user accounts 180, each of which may include account information 185 associated with consumers and service providers, such as banks or credit card companies. For example, account information 185 may include private information of customers/service providers, such as account numbers, passwords, device identifiers, user names, phone numbers, credit card information, bank information, or other sensitive information which may be used to facilitate customer identity validation.

A validation processing application 190, which may be part of validation application 175 or separate, may be configured to receive customer validation requests from user device 110 and/or service provider device 140 for customer identity validation. Validation processing application 190 may include one or more applications to process identity information of user 105 for customer identity validation. As such, validation processing application 190 may store details of a validation request from individual users or service providers. Validation application 175 may be further configured to determine the existence of and to manage accounts for user 105 and service providers, as well as create new accounts if necessary.

The central depository server 170 may include a database storing customer identity information, identity validation request history, account history, credit history of users/service providers, and/or other public information of the customer. The information stored in the database may be used for analyzing customer identity validation. The central depository server 170 may also retrieve credit reports from credit reporting services and may incorporate various credit reports into the customer identity validation process.

Figure 2:
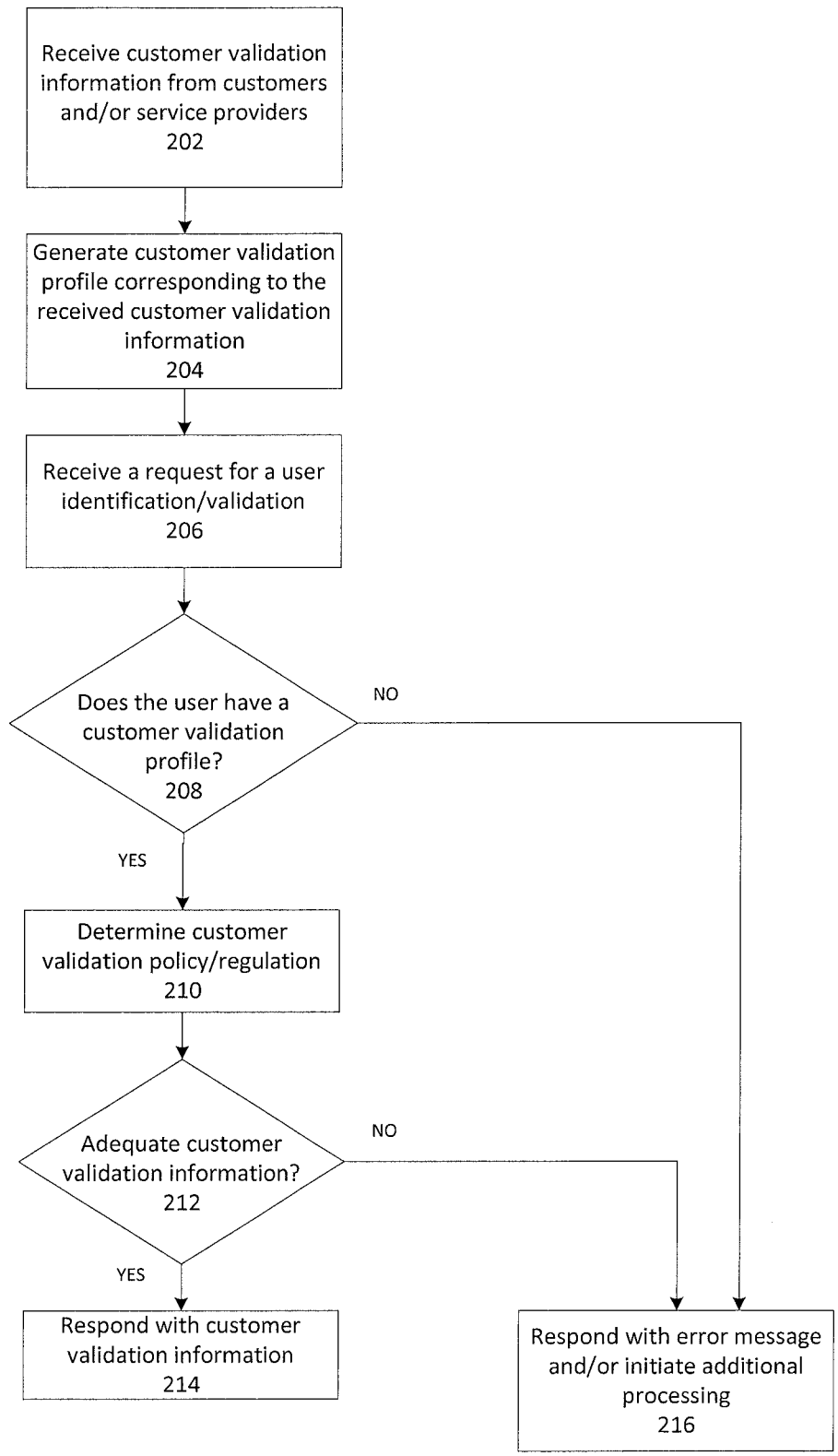
FIG. 2 is a flowchart showing a process for implementing customer identity validation according to one embodiment.

FIG. 2 is a flowchart showing a process 200 for implementing customer identity validation according to one embodiment. In an embodiment, the process 200 may be implemented at the central depository server 170. In some embodiments, the process 200 may be implemented by the central depository server 170, the user device 110, and/or the financial service provider device 140 in coordination with each other.

At step 202, the central depository server 170 may receive customer validation information from customers and/or commercial/government/non-profit institutions. For example, customers may register with the central depository server 170 by creating a user/customer account and may provide various identity validation information, such as legal name, contact information, age, gender, marital status, residence information, and the like, to the central depository. The user 105 also may provide various proofs of identity, such as driver's license, birth certificate, US passport, marriage certificate, professional certificate, and the like to the central depository. For example, the user 105 may use a camera or a scanner provided with the user device 110 to scan or capture an image of a document and may send an electronic copy of the image to the central depository. The central depository may analyze the images of various documents, including determining their authenticity, and may extract identity information of the user 105 from the images, such as by text recognition technology. The user 105 may permit the central depository to store and share user identity information to registered service providers. In some embodiments, the user 105 may be allowed to designate privacy settings as to whom and where the user 105's information may be shared.

In some embodiments, the information may be made available in a variety of formats depending on the required validation considerations. For a payment entity or a financial entity, the required information and validation may be prescribed by a government or regulatory body. In other situations, such as health information, the information may include a variety of variables, such as different aspects of health information. These various embodiments may be implemented using an application interface to procure or share information in a secure and trusted manner. This may occur as a background process initiated by the requesting entity, wherein a central depository is configured to communicate through the interface.

In some embodiments, validation information is stored in various distributed modules and/or locations. When a user validation is requested at a central validation collector, such as a central depository server or a service provider, the various information is compiled from a variety of sources. For example, a user may set up a new account at an online payment provider. The payment provider requests a variety of information, some of which was verified at the Dept. of Motor Vehicles, other information was verified to a bank, and other information was verified by a third entity. The central validation collector then collects and collates the information, which is then provided to the payment provider for the user. The information may be encrypted prior to provision, or the central validation collector may send an approval or rejection message in response. A variety of scenarios are considered which benefit from previously validated information from trusted sources. These methods enable a user to access one or more validation sources through a single entry or request. Where multiple validation sources are accessed, each source may provide a specific token or code; in some embodiments each specific token is compiled and configured into a new token.

Service providers may communicate identity information they received from customers to the central depository. Service providers may register and/or subscribe to the customer identity validation service provided by the central depository. For example, a service provider may agree to share customer identity information with the central depository in exchange for receiving other customer identity information stored at the central depository. Different levels of subscriptions may be offered by the central depository based on types of services, types of KYC requirements/regulations, geographical location, and/or jurisdiction. Service providers may select the level of subscription. For example, a service provider may subscribe to have access to customers within a certain state for a certain type of KYC requirement/regulation. As such, the service provider may obtain customer identity validation information for customers within the state or for the designated type of KYC requirement for a fixed monthly fee or annual fee and may pay additional fees for customers outside of the state or for another type of KYC requirement.

At step 204, the central repository may aggregate customer identity information from various sources and may generate customer validation profile for each user/customer. The customer validation profile may include a user's name, contact information, birth date, social security number, residence information, nationality, account history, and other various proofs of identity. The customer validation profile also may include where the identity information was originated or obtained. For example, the customer's basic information, e.g., name, address, birthdate, and the like, may first be obtained from a state bank. Further, the customer's basic information also has been later received and verified four more times from four other service providers.

The central repository server 170 may keep a block chain or history of various identity validation requests/transactions for the customer. The central repository may determine or calculate a trust score for the customer's identity information. The trust score may be increased as more service providers verify and confirm the same identity information for the user. The trust score may be decreased if a service provider reports certain discrepancies in the customer's identity information. The trust score also may be substantially reduced when a service provider reports that the customer's identity information has been compromised or there is evidence of identity theft on the customer's identity information, or there is a reason to believe the information provided by the customer is not accurate.

The central repository server 170 may store images or information related to identity documents with the customer validation profile, such as images of driver's license, birth certificate, passport, marriage certificate, professional license/certificate, social security card, and the like. The central repository server 170 may establish an identity document profile for each identity document. The identity document profile may store the name of the identity document (e.g., driver's license, birth certificate, and the like), identity information listed on the identity document (e.g., name, birth date, social security number, and the like), issuing authority (e.g., state or federal government, professional organization, and the like), expiration date, quality of the identity document (e.g., new, good, page defects, and the like), and/or available images of the identity document (e.g., front, back images, pages, and the like). As the present invention is adopted, this may lead to new types of verification by specific entities, wherein the distribution of the information adds to the accuracy and security. For example, the service may receive name information and citizenship from a national registry, address information from a local registry and compare the information received. When a problem is detected, the error or issue may be sent to each of the registries to record and match against future requests.

The identity document profile also may include a verification history listing where the identity document has been presented and verified. For example, the customer/user may have presented the identity document to different service providers, such as banks, credit unions, and the like. The verification history may include the location, time, and date where the identity document was reviewed and verified and the organization/institution and/or the person/official who reviewed and verified the identity document. For example, a customer may have presented his/her driver's license to open an account at a bank. The driver's license was reviewed and verified by an account manager at the bank. The customer also may have presented the driver's license at several airport security check lines and was reviewed and verified by different TSA agents. Each of these verification events may be recorded and shared with the central depository including image scans of the driver's license at each verification event.

The central depository server 170 may determine/calculate an authentication score for each identification document based on the identity information available from the identity document and the identity document's verification history. For example, the central depository server 170 may increase the authentication score if a detailed and good quality image of the identity document is provided to the central depository server 170. The authentication score may be increased if the identity document is verified by credible entities, officials, or persons, such as by a bank manager of an established national bank, as compared to a store clerk of a small merchant. The authentication score may be increased if the identity document is verified frequently (e.g., at least twice every month) or more recently (e.g., a week ago). In another example, newly issued identity documents may have higher authentication scores as compared to identity documents that are near expiration. In another example, the central depository server 170 may determine or calculate the authentication score of an identity document based on where the identity document was presented or used. If the identity document is used frequently in a location where financial fraud is rampant, the identity document may have a lower authentication score.

In still another example, the authentication score may be decreased when suspicious activities are detected related to the identity document. For example, when the identity document is presented at two different locations that are remote from each other indicating that the identity document may have been falsified or unlawfully duplicated, the authentication score may be substantially decreased. When the identity document is reported as missing or stolen, the authentication score may be decreased as well. In some embodiments, when an identity document is determined or reported as stolen, the central depository server 170 may suspend the identity document and the related information from being shared or used for identification validation. As such, a combination of various factors may be used to determine/calculate the authentication score of the identity information.

At step 206, the central depository server 170 may receive a request for a user identification/validation. The request for customer identification/validation may be received from the customer whose identity is to be verified or from a service provider. For example, the user 105 may use the user device 110, e.g., mobile device, to send an identification validation request to the central depository server 170. The customer validation request may be received from a service provider who wishes to verify a customer's identification based on KYC regulation/requirement. For example, a service provider may use the service provider device 140 to send an identification validation request to the central depository server 170.

At step 208, the central depository server 170 may determine whether the customer to be verified is a registered customer who has a customer validation profile. In particular, the central depository server 170 may search/query for a customer validation profile associated with the customer. The central depository server 170 may search for the customer validation profile using the customer's name or based on a unique code/number previously assigned/designated for the customer when the customer was registered at the central depository. If no customer validation profile is found to be associated with the customer, the central depository server 170 may respond to the requesting customer or the requesting financial service provider with an error message at step 216. The error message may indicate that the central depository currently does not have any identity information associated with the customer. The error message also may include an option for the customer or the financial service provider to create a customer validation profile for the customer.

If a customer validation profile is found for the customer, the central depository may determine customer validation policy/regulation at step 210. The customer validation or KYC policy/regulation may be determined based on the type of service as indicated by the customer or the service provider. The KYC policy/regulation also may be determined based on the location or jurisdiction where the customer or the service provider is located. For example, the user device 110 and/or the service provider device 140 may include a Global Positioning System (GPS) configured to detect GPS location of the device. The user device 110 or the service provider device 140 may communicate the GPS location to the central depository server 170. The central depository server 170 may determine the application KYC policy/regulation based on the GPS location.

The KYC policy/regulation may indicate the requirements for verifying or validating a customer. For example, the KYC regulation may require two forms of identity documents. The KYC regulation may have a list of different types of identity documents that are qualified to meet the KYC regulation. The KYC regulation also may include various types of customer information that are required to be collected from the customer, such as name, birth date, social security number, and the like.

At step 212, the central depository server 170 may determine whether there is adequate customer validation information stored at the central depository to meet the requirements of the determined KYC policy/regulation. For example, the KYC policy/regulation may require validation of user name, birth date, social security number, and residence. Further, the KYC policy/regulation may require two qualified identity documents. The central depository server 170 may analyze the customer validation profile and may determine that the customer validation profile includes adequate identity information to meet the KYC regulation but is missing one qualified identity document as required by the KYC regulation. In some embodiments, when the authenticity score of an identity document is below a certain threshold or the identity document is determined to be compromised, the central repository server 170 may prohibit the identity document to be used for customer validation. As such, the central repository server 170 may not present this identity document to the customer or service provider.

If the central repository has adequate information to validate the customer as required by the KYC regulation, the central repository may respond with the required customer validation information at step 214. For example, the central repository server 170 may communicate the required information, such as the required customer identity information or images of identity documents, to the customer or the service provider. In some embodiments, the central repository server 170 may communicate the trust score for the customer and/or the authenticity score for the identity documents to the service provider as well.

If the central repository does not have adequate information to validate the customer as required by the KYC regulation, the central repository may respond with an error message 216. For example, the central repository server 170 may indicate what information or identity document is missing. In some embodiments, the central repository server 170 may provide the customer or service provider with what is required and available at the central repository and may indicate what other information or document is still missing. Thus, the customer may be requested to provide the missing information or identity documents to the service provider.

Figure 3A:
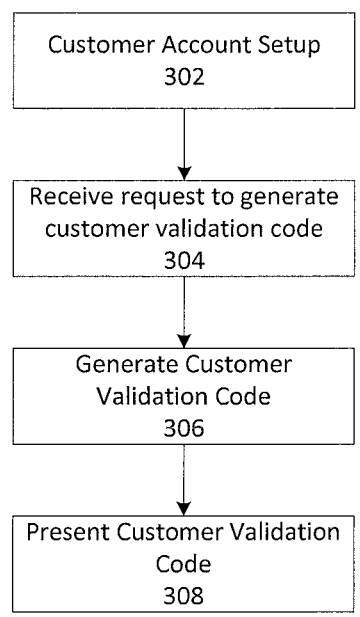
FIG. 3A is a flowchart showing a process for requesting customer identity validation at a mobile device according to one embodiment.

FIG. 3A is a flowchart showing a process 300 for requesting customer identity validation at a mobile device according to one embodiment. At step 302, the user 105 may register or sign up for a customer identity validation account with the central depository. For example, the user 105 may activate/operate a mobile app at the user device 110 to connect to an API at the central depository server 170 to sign up for a customer identity validation account. The user 105 may then be requested by the mobile app to enter various personal and/or identity information, such as name, resident address, contact information, birth date, social security number, and the like.

The mobile app also may allow the user 105 to select whether they would like to use a unique code/token to request for customer identity validation. The unique code/token may be presented to service providers who request customer identity validation. The financial providers may use the customer's unique code/token to retrieve the customer's identity information from the central repository. The user 105 may agree to allow the central depository to share the user 105's identity information with the service provider, to whom the user 105 presents the unique code/token.

At step 304, the user device 110 may receive the user 105's request to generate customer validation code. For example, when the user 105 is applying or registering for a new account or for a new service at a service provider. The service provider may request that the user 105 provide various identification information or documents. The user 105 may request the identity validation app on the user device 110 to generate a customer validation code, e.g., unique validation code/token.

Figure 5C:
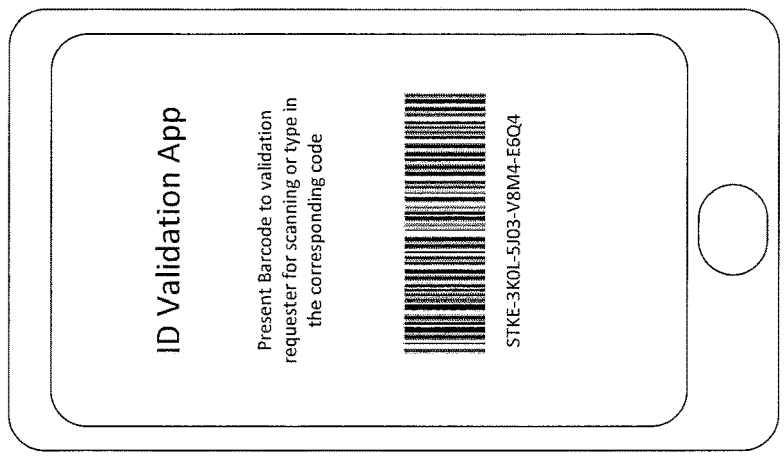
FIGS. 5A-5C are diagrams illustrating various mobile device user interfaces for facilitating customer identity validation according to one embodiment.
Figure 5B:
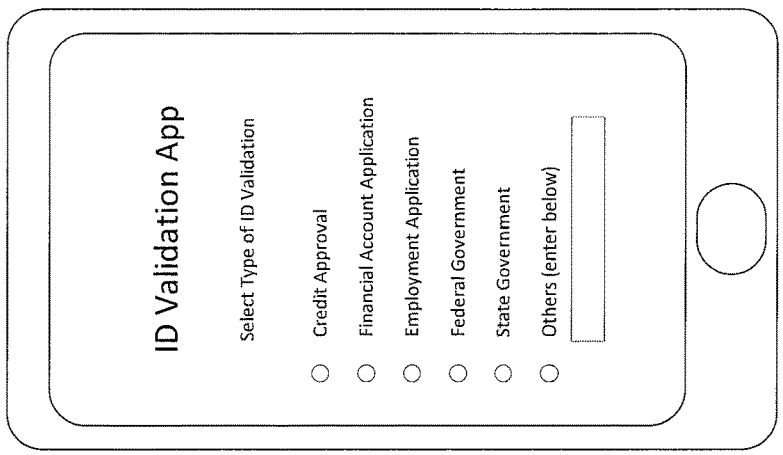
Figure 5A:
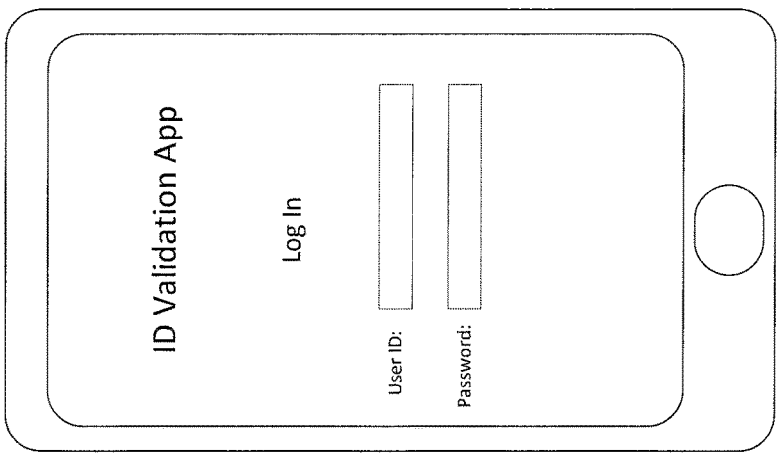

For example, as shown in FIG. 5A, the user 105 may first login at the identification validation app by entering the user 105's user ID and password. The identification validation app may authenticate the user 105 based on the entered ID and password. Other authentication means may also be used, such as biometric authentication using a fingerprint or retina. As shown in FIG. 5B, after the user 105 is authenticated, the identification validation app may request that the user 105 select from various types of identification validation, such as credit approval, account application, and the like.

In some embodiments, the identification validation app may detect the GPS location of the user device 110 and may determine the service provider where the user 105 is visiting. For example, the user device 110 may determine based on the GPS location that the user 105 is visiting a commercial bank or health club. Based on the service provider, the identification validation app may automatically select the type of identification validation for the user 105. For example, if the user 105 is visiting a bank, the identification validation app may automatically select a customer ID validation for bank account application/registration. If the user 105 is visiting a health club, the identification validation app may automatically select a customer ID validation for health club membership. In an embodiment, the user 105 may enter other types of ID validation in the provided space, as shown in FIG. 5B.

At step 306, a unique code/token for customer identity validation may be generated. The unique code/token may be an alphanumeric identifier with a predetermined number of digits. In particular, the alphanumeric identifier may have a certain convention with each digit indicating various information regarding the user 105 or the user's account, such as version of mobile payment application on the user device 110, user's month of birth, unique identifier or token expiration day, expiration month, user's birth year, random alphanumeric digits, user device type, device operating system, transaction type, offline payment enable flag, payment current code, portions of the social security number, and the like. Various information may be embedded in a particular order, format, and/or convention in the unique code/token with random alphanumeric digits inserted among them.

For example, in a 16-digit unique identifier, the first 5 digits may be randomly generated numbers/characters, the 6$^{th}$ digit may indicate a version of the user 105's mobile app, and the 7$^{th}$ through 12$^{th}$ digits may be portions of the user 105's SSN. Particular portions the SSN may be selected, such as the first three digits and the last four digits. The portions of the SSN may be arranged in a particular order and inserted in the unique identifier. The 13$^{th}$ digit of the unique identifier may be designated for indicating the user 105's birth month, the 14$^{th}$ digit of the unique identifier may be designated for indicating the unique identifier's expiration, the 15$^{th}$ digit of the unique identifier may be another randomly generated alphanumeric character, and the 16$^{th}$ digit of the unique identifier the user's birth day. Different sizes/formats/conventions of the unique identifier may be used as needed and changed periodically or randomly to improve security. For example, a 16 digit, 32 digit, or any number of digit may be used for the unique identifier, as needed. Further, the function and meaning of each digit of the unique identifier may be designated by the central depository and kept confidential. As such, the size/format/convention of the unique identifier may be kept confidential by the central depository and non-authorized entities may not be able to generate fake unique identifiers.

In some embodiments, the unique code/token may be encrypted for enhanced security. Various encryption techniques may be used to encrypt the unique identifier. For example, a public/private key encryption technique may be used. A private key maybe generated and stored at the central depository sever 170 and a public key may be communicated to the user device 110. The public key may be used to encrypt a unique code/token at the user device 140. The central depository server 170 may then use the private key to decrypt the unique code/token later. Thus, the communication of unique code/token between the central depository server 170 and the user device 140 may be secured.

In some embodiments, the unique code/token may be generated by the identification validation app at the user device 110 without connecting to the central depository server 170. As such, the user device 110 may generate the unique code/token without server side interaction. For example, after the initial registration process with the central depository, the user 105 may subsequently use the mobile payment app on the user device 110 to generate or refresh the unique code/token. In this case, the mobile identification validation app may include the functions and/or algorithm for generating or refreshing the unique code/token by itself, without having to connect to the central depository server 170. For example, the public key stored at the user device 110 may be used to generate a new unique code/token. This may be useful when the user device 110 is at a location where network connection is weak or not available. The user 105 may still able to use the mobile identification validation app at the user device 110 to generate or refresh the unique code/token for customer identity validation.

At step 308, the unique code/token may be displayed on the user device 110. For example, as shown in FIG. 5C, the unique code/token may be displayed as a scannable bar code. The alphanumeric characters of the unique code/token also may be displayed together with the bar code. In other embodiments, the unique code/token may be displayed as a Quick Response (QR) code. The bar code or the QR code may be scanned or otherwise captured by a scanning device of the service provider device 140 of the service provider or entity requesting the user 105's identity validation. The service provider or the requesting entity may then send the unique code/token along with a request for identity validation of the user 105 to the central depository server 170. The bar code may have an expiration, after which it is not valid. Similarly, the confirmation may be multiple bar codes, provided over a period of time.

Figure 3B:
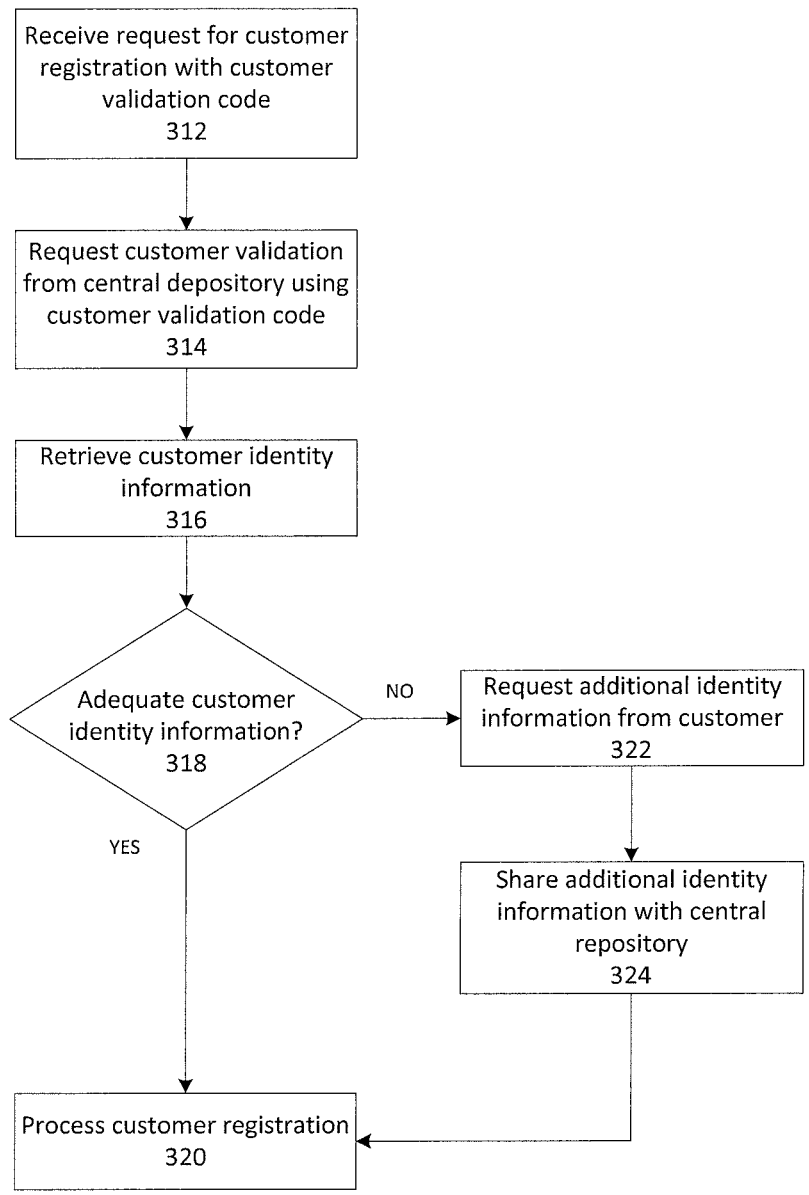
FIG. 3B is a flowchart showing a process for requesting customer identity validation at a financial service provider according to one embodiment.

FIG. 3B is a flowchart showing a process 310 for requesting customer identity validation at a service provider according to one embodiment. At step 312, the service provider device 140 may receive the unique code/token from the user 105. As noted above in step 308, when the service provider requests identity information or identity documents from the user at a point of sale (either physical or virtual), the user 105 may use the ID validation app on the user device 110 to provide a unique code/token to the service provider. In some embodiments, the user 105 may input or enter the alphanumeric code of the unique identifier at the service provider's website or POS device. In an embodiment, the mobile ID validation app at the user device 110 may generate the unique code/token in real time in response to the user 105 requesting a new unique code/token on the mobile app. In another embodiment, the unique code/token may have been generated previously and stored in the mobile app ready to be used.

At step 314, the service provider device 140 may request customer validation from the central depository server 170 using the customer unique code/token. For example, the service provider device 140 may communicate the unique code/token along with a request for customer identity validation on the user 105 to the central depository server 170. In an embodiment, the service provider device 140 may be installed with a mobile app including functions for scanning and communicating the customer unique code/token to the central depository. The request may include various information related to the purpose and type of customer identity validation. For example, the request may include information on the identity of the requesting service provider, purpose/reason for the customer identity validation (e.g., new account, new loan, new mobile phone account, job application, government security clearance, and the like), type of service, KYC regulation/jurisdiction, and the like. In other examples, the request may include particular identity information or identity documents that are required to be verified.

The service provider may have an account and/or subscription with the central depository for accessing customer identity information/documents. In some embodiments, the service provider may pay a fee for each customer identity verification. In some embodiments, the service provider may pay a fixed subscription fee for each month or year to obtain unlimited amount to customer identity information. In some embodiments, the service provider may share customer information with the central depository in exchange for having access to other customer information.

After receiving the customer validation request from the service provider, the central depository server 170 may validate the unique code/token received from the service provider. The central depository server 170 may ensure that the unique code/token is not fraudulent. For example, the central depository server 170 may include a token decoder configured to decode the received unique code/token if the unique code/token is encoded or encrypted using a private key. If the unique code/token is not able to be decoded or decrypted, the unique code/token may be invalid or defective. In this case, the merchant or the requesting entity may be notified of the invalidity or defect.

If the unique identifier is decoded or decrypted, the central depository server 170 may validate the unique code/token against pre-defined rules, regular expressions, and other details from the account of the user. For example, the central depository server 170 may check to make sure that the unique code/token is not expired. The central depository server 170 also may check to make sure that the format and convention of the unique code/token matches those defined by the central depository. The information encoded in the unique code/token also may be checked to make sure they match the information in the user 105's customer validation account with the central depository. For example, the unique code/token may be encoded with other personal information of the user 105, such as location, birth date, SSN, and the like. Any discrepancies may be detected and used for authentication determination. If the unique code/token is found to be invalid, a message indicating that the unique code/token has defect may be notified to the user 105 or the service provider.

At step 316, the central depository server 170 or the service provider device 140 may retrieve the customer identity information of the user 105. For example, the central depository server 170 may search or query the database to find the user 105's customer validation profile and customer identity information stored in the customer validation profile. The customer identity information may include the user 105's various identity/personal/financial information, and images/information related to identity documents. The customer identity information also may include identity validation history indicating where and when the customer has been validated. The financial service provider device 140 may retrieve the customer identity information from the central depository server 170.

At step 318, the service provider device 140 may determine whether adequate identity information is available to validate the customer/user 105 based on the KYC regulation/requirement applicable to the service provider. For example, the service provider device 140 may determine, based on the KYC requirement, the types of identity information and/or identity documents required to validate the identity of the customer. The service provider device 140 may analyze and compare the identity information/document retrieved from the central depository with the identity information/document required by the KYC regulation to determine whether they meet the KYC regulation. If so, the service provider may validate the user 105 and may process the user 105's registration or service at step 320.

If the identity information/document retrieved from the central depository does not meet the KYC regulation, the service provider device 140 may determine the missing identity information/document and may request additional identity information/document from the user 105 at step 322 to meet the KYC regulation. At step 324, the service provider may share the received additional identity information with the central repository. For example, the service provider may have a subscription or agreement with the central depository to share any received customer identity information with the central depository. The sharing of customer identity information also may be subject to the privacy agreement between the customer and the service provider. The central depository may update validation history for the customer based on this current customer identity validation.

Accordingly, the central depository may allow customers and service providers to share customer identity validation information. A customer may be validated by aggregating identity information/document from multiple sources. Further, a user may use a mobile ID validation app to generate and present a unique code/token which may be used by a service provider to request identity information/document from the central depository. As such, the user does not have to carry and provide identity information/documents each time the user opens a new account or implements a new transaction. The central depository may act as the middle person between the customers and the service providers to customer identity validation to meet various KYC regulations/requirements.

In some embodiments, the system/method may be implemented without the central depository. For example, a group of service providers may form an alliance to share customer validation information with each other. When a member of the alliance needs to validate a customer, the member may query the other members to obtain customer identity information/document from the other members. Each member of the service provider alliance may implement a block chain of customer validation information/document and validation history for each customer. Thus, a customer's validation profile may be continuously updated and shared among the group of service providers without a central depository.

Figure 4:
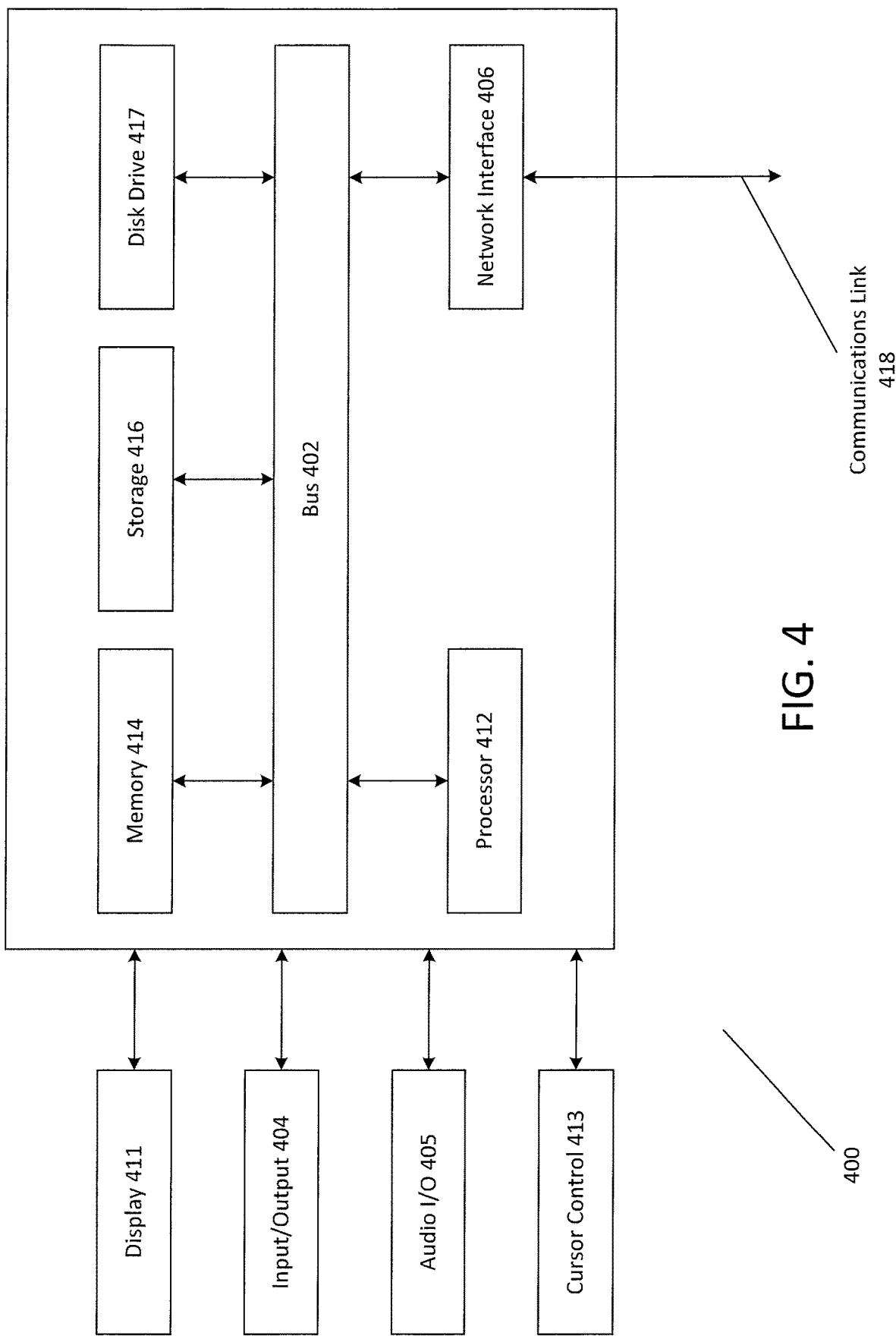
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, wearable computing device, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 160. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A mobile device comprising:
   a non-transitory memory; and
   one or more hardware processors coupled to the non-transitory memory and configured to read instructions from the non-transitory memory to cause the mobile device to perform operations comprising:
   receiving, via a user input device, a request for providing a unique code associated with a user;
   retrieving or generating the unique code associated with the user via a mobile identity validation application on the mobile device, wherein the unique code comprises randomly generated alphanumeric characters disposed at a plurality of predetermined positions of the unique code, and wherein the unique code is usable to access identity validation information of the user at a central depository; and displaying the unique code on a display component of the mobile device via the identity validation application.

2. The mobile device of claim 1, wherein the unique code is a machine-readable code scannable by a service provider device.

3. The mobile device of claim 1, wherein the unique code comprises identification information for identifying a customer validation profile of the user based on a format or a convention predetermined by the central depository.

4. The mobile device of claim 1, wherein the randomly generated alphanumeric characters are interspersed within the identification information in the unique code.

5. The mobile device of claim 1, wherein the operations further comprise encrypting the unique code based on a public key received from the central depository.

6. The mobile device of claim 1, wherein the unique code is displayed in a form of a scannable Quick Response (QR) code or a bar code.

7. A system comprising:
a non-transitory memory; and
one or more hardware processors coupled to the non-transitory memory and configured to read instructions from the non-transitory memory to cause the system to perform operations comprising:
receiving a request for providing a customer identity verification of a user to a first service provider, the request including a unique code associated with a customer validation profile of the user stored at a central depository;
retrieving first identity information of the user from the customer validation profile of the user using the unique code;
retrieving second identity information of the user from a second service provider different from the first service provider; and
communicating the first and second identity information of the user to a device associated with the first service provider.

8. The system of claim 7, wherein the operations further comprise:
determining a customer validation requirement based on the request; and
selecting a portion of identity information from the customer validation profile based on the customer validation requirement, wherein the first identity information corresponds to the selected portion of identity information.

9. The system of claim 8, wherein the customer validation requirement is determined based on an attribute associated with the first service provider.

10. The system of claim 8, wherein the customer validation requirement is determined based on a jurisdiction where the first service provider is located.

11. The system of claim 10, wherein the operations further comprise determining a location of the device associated with the first service provider.

12. The system of claim 7, wherein the operations further comprise:

determining that the first identity information retrieved from the customer validation profile lacks information corresponding to a particular information type required based on the request; and
communicating an error message indicating incomplete information to a user device of the user.

13. The system of claim 12, wherein the error message comprises a request for the information corresponding to the particular information type, and wherein the operations further comprise:
receiving the information corresponding to the particular information type from the user device of the user; and
updating the customer validation profile of the user with the information received from the user device of the user.

14. The system of claim 7, wherein the operations further comprise:
determining whether the unique code is validated based on a predetermined format or convention; and
communicating an error message to a user device associated with the user or the device associated with the first service provider when the unique code is not validated.

15. The system of claim 7, wherein the operations further comprise:
decrypting the unique code with a private key, wherein the private key corresponds to a public key provided to a user device associated with the user.

16. A non-transitory machine-readable medium having stored thereon machine-readable instructions executable to cause a machine to perform operations comprising:
receiving a request for performing a customer identity verification of a user, the request including a unique code associated with a customer validation profile of the user stored at a central depository;
retrieving identity information of the user from the customer validation profile of the user using the unique code;
determining that the customer validation profile lacks information of a particular information type;
retrieving the information of the particular information type from a user device associated with the user;
updating the customer validation profile with the information retrieved from the user device; and
communicating the identity information from the updated customer validation profile of the user to a device associated with a service provider.

17. The non-transitory machine-readable medium of claim 16, wherein the identity information retrieved from the customer validation profile is a portion of information included in the customer validation profile, and wherein the operations further comprise:
determining a customer validation requirement based on the request; and
selecting the portion of information from the customer validation profile based on the customer validation requirement.

18. The non-transitory machine-readable medium of claim 16, wherein the operations further comprise:
in response to determining that the customer validation profile lacks the information of the particular information type, communicating, to the user device, a message requesting for the information of the particular information type.

19. The non-transitory machine-readable medium of claim 16, wherein the operations further comprise:

generating a private key and a public key associated with the customer validation profile of the user; and communicating the public key to the user device.

20. The non-transitory machine-readable medium of claim 19, wherein the operations further comprise:

decrypting the unique code using the private key; and identifying, from a plurality of customer validation profiles associated with a plurality of users, the customer validation profile based on the decrypted unique code.

\* \* \* \* \*